(12) United States Patent
Maziere et al.

(10) Patent No.: US 8,024,845 B2
(45) Date of Patent: Sep. 27, 2011

(54) BUCKLE OF A SEAT BELT FOR A MOTOR VEHICLE

(75) Inventors: Jean-françois Maziere, Trappes (FR); Faouzi Saidani, Antony (FR)

(73) Assignee: Leoni Wiring Systems France, Montigny le Bretonneux (FR)

( * ) Notice: Subject to any disclaimer, the term of this patent is extended or adjusted under 35 U.S.C. 154(b) by 646 days.

(21) Appl. No.: 11/576,505

(22) PCT Filed: Oct. 5, 2005

(86) PCT No.: PCT/FR2005/002442
§ 371 (c)(1),
(2), (4) Date: Oct. 20, 2008

(87) PCT Pub. No.: WO2006/040437
PCT Pub. Date: Apr. 20, 2006

(65) Prior Publication Data
US 2009/0049665 A1    Feb. 26, 2009

(30) Foreign Application Priority Data
Oct. 7, 2004 (FR) .................................. 04 10577

(51) Int. Cl.
*A44B 11/26* (2006.01)

(52) U.S. Cl. .......................... 24/633; 280/735; 180/268

(58) Field of Classification Search .................. 24/633, 24/651; 280/734, 735, 801.1; 180/268–270; 200/61.58 B; 340/457.1, 438
See application file for complete search history.

(56) References Cited

U.S. PATENT DOCUMENTS
5,590,904 A    1/1997    Ellis et al.

FOREIGN PATENT DOCUMENTS
| DE | 100 33 403 A1 | 1/2002 |
| FR | 2 553 640 A | 4/1985 |
| WO | WO 03/078218 A | 9/2003 |

OTHER PUBLICATIONS
International Search Report dated Oct. 3, 2006, PCT/FR2005/002442.

*Primary Examiner* — James Brittain
(74) *Attorney, Agent, or Firm* — Howard M. Gitten; Edwards, Angell Palmer & Dodge, LLP

(57) ABSTRACT

Buckle of a seat belt for a motor vehicle comprising a male part and a female part characterized in that it comprises electric contacts carried by two tongues (30, 35), a first tongue (30) comprising a V-shaped section with two branches (31, 32), one of which constitutes an electric contact and a cambered end (34), the convex sections of these two sections facing opposite the second tongue (35) which has a V-shaped section with branches (36, 37), one of which constitutes an electric contact and is designed to bear against the electric contact of the first tongue (30), the cambered section (34) being designed to cooperate with a bar (10) to control the opening of the electric contacts moved by the introduction of the male part of the buckle.

4 Claims, 4 Drawing Sheets

BUCKLE OF A SEAT BELT FOR A MOTOR VEHICLE

The present invention relates to a buckle of a seat belt for a motor vehicle.

Buckles of seat belts generally comprise a female element connected to a fixed point of the vehicle and a male element with a pin designed to be inserted into a housing of the female part, the latter being provided with means for locking said pin.

Given that it is compulsory to wear a seat belt, modern vehicles comprise means for indicating to the driver and any passengers that their belt has not been fastened. Said indicating means are generally in the form of an icon on the instrument panel or an audio signal and possibly both.

The female element generally comprises contacts inserted into a feed circuit of indicating means, which contacts are closed so that the said indicating means are powered and which are opened by the introduction of the pin of the male element.

Generally, the female element comprises on the interior an insulating bar mounted in a sliding manner against the action of a spring and designed, upon the introduction of the pin, to be moved by the latter so as to be inserted between the contacts.

Seat belts are buckled and unbuckled a large number of times, especially in vehicles used in cities, and it has been noticed that the repeated friction of the bar against the contacts causes premature wear of the latter and there is thus a risk that the indicating means may no longer be activated.

One of the aims of the invention is to overcome this disadvantage.

The seat belt according to the invention is of the type comprising a female element consisting of an insulating housing in which electric feed circuits are housed for means of indicating the closure or opening of the buckle, said circuits comprising electric contacts that are kept in a closed position and can be separated by a mobile insulating bar in the housing against the action of elastic means, and a male element mounted on the belt and comprising a pin designed to be engaged in a slot of the female element and to be clamped in the latter by unlockable elements, the introduction of said pin in the slot causing the movement of bar which controls the opening of the electric contacts, the said buckle of the seat belt being characterised in that the electric contacts are mounted on two tongues, a first tongue having a V-shaped section with two branches, one of which constitutes an electric contact and a cambered end, the convex sections of these two parts facing opposite the second tongue which has a V-shaped section with branches, one of which constitutes an electric contact and is designed to bear against the electric contact of the first tongue, the cambered section being designed to interact with the bar to control the opening of the electric contacts.

By way of this arrangement the electric contact zone is separated from the mechanical contact zone, in fact the movable, insulating mobile bar does not affect the electric contacts and the separations or the application of the latter against one another are conducted without causing significant friction.

According to one embodiment the second tongue is extended by a cambered section the convex section of which is opposite the cambered section of the first tongue.

The cambered section of one of the tongues is pierced by an opening into which the cambered section of the other tongue is inserted.

Finally, the electric contacts are of the sliding contact type

The invention will now be described in more detail with reference to particular embodiments, which are given by way of example only and represented in the attached drawings.

Figure 1:
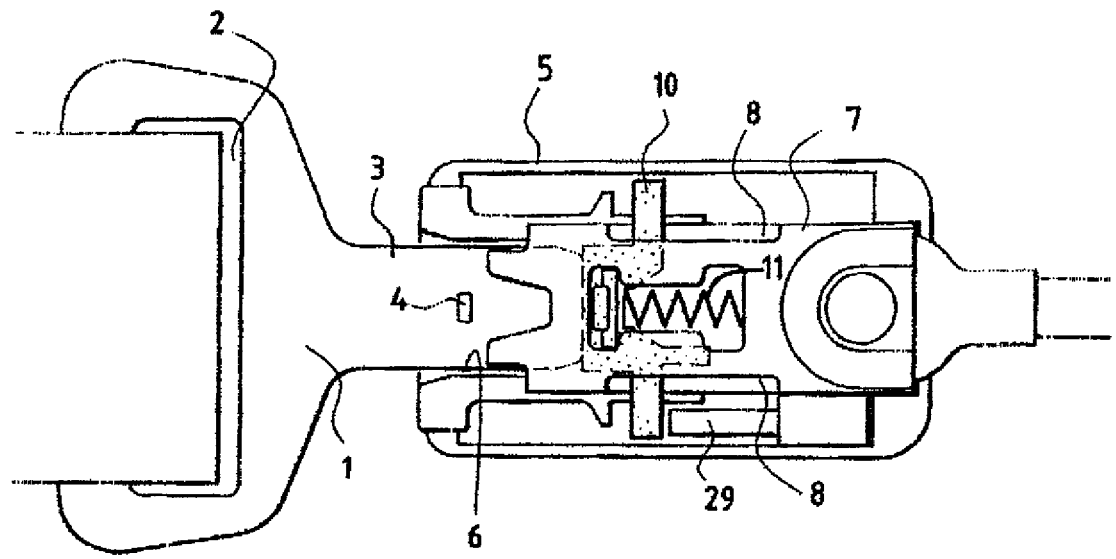
FIG. 1 shows schematically in a cut away view a buckle of a belt at the time of inserting the pin.
Figure 2:
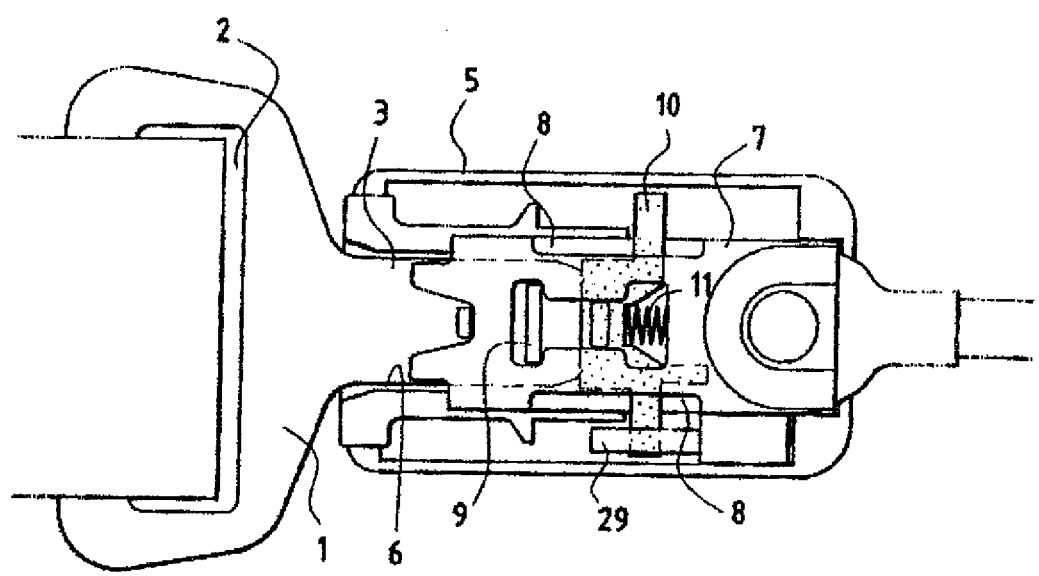
FIG. 2 is a similar view to FIG. 1 the pin being engaged and locked.

The buckle of the seat belt shown in FIGS. 1 to 5 comprises a male element 1 with a slot 2 for inserting the belt and a pin 3 at the end with an opening 4 designed to hold a locking hook.

The buckle is completed by a female element 5 in the form of an insulating housing with a slot 6 for the introduction of the pin 3 and means for retracting the hook to make it possible to remove the pin from the female element and thus open the belt. These arrangements are standard and are not shown here in detail.

Inside the female element 5 is a metal shell 7 which has two elongated openings 8, in which a moving insulating bar 10 is guided against the action of a compression spring 11 mounted in the shell 7.

Figure 3:
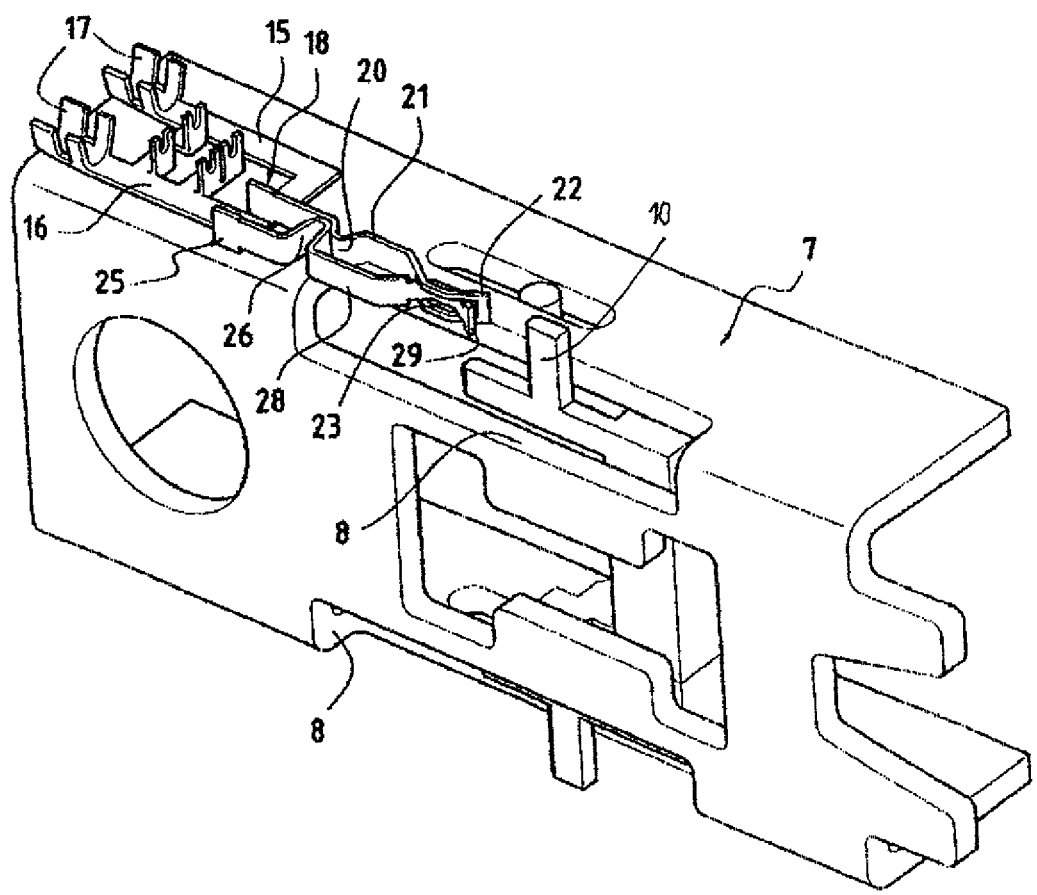
FIG. 3 is a perspective view of a detail.
Figure 4:
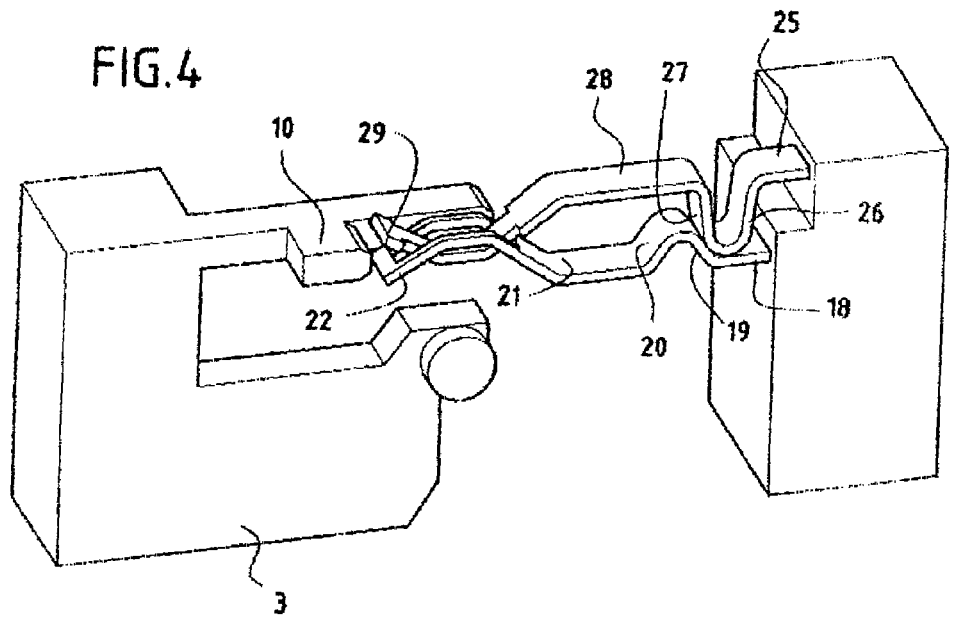
FIG. 4 and FIG. 5 are schematic views in perspective showing the function.
Figure 5:
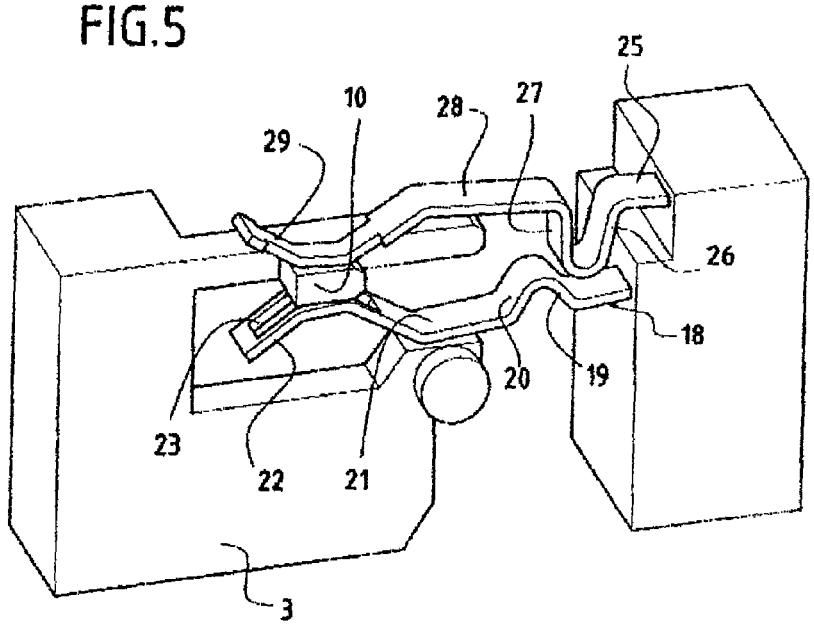

On the side of the shell are the circuits 15 and 16 which are designed to be inserted into a feed circuit for the indicating means (see FIG. 3).

Preferably, the circuits 15 and 16 are punched out circuits in which crimping tabs 17 are formed for the branching of electric conductors.

The circuit 15 is shaped to have an elongated tongue 18 with a section folded into a V so as to form two branches 19 and 20, branch 20 being connected to a rectilinear section 21 which forms a bend with the branch 20 and with a circular arc 22 section at the end pierced by a slot 23. The convex sections of the V shape and of the circular arc section are formed in opposite direction to a complementary tongue 25 formed in the circuit.

The complementary tongue 25 is folded with a V-shaped section with two branches 26 and 27, a rectilinear section 28 forming a bend with the branch 27 and an end section in the form of an arc of a circle 29 passing through the slot 23

The convex sections of the V-shaped parts and the arc of the circle of the complementary tongue are formed in opposite direction to tongue 18.

The V-shaped sections of the two tongues 18 and 25 are arranged such that in a position of rest the branch 27 bears against branch 19, said branches forming sliding type electric contacts to ensure self-cleaning The free ends of the terminal sections 22 and 29 are arranged in the path of the insulating bar 10.

Upon the introduction of the pin 3 into the slot 6 the former pushes the insulating bar 10 against the action of the spring 11 so that it is inserted between the two terminal sections 22 and 29, such that branch 27 and branch 19 are separated elastically from one another thus opening the circuit. It is intended that by way of this arrangement the electric contacts of the sliding type are separated and closed practically without any friction (see FIGS. 4 and 5).

Figure 6:
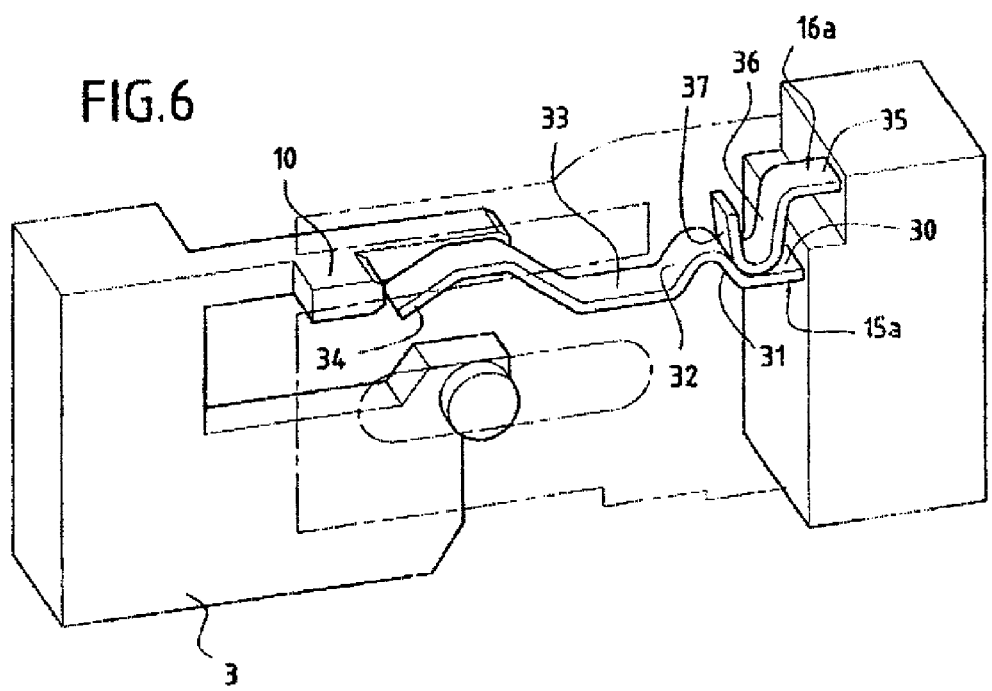
FIG. 6 and FIG. 7 are perspective views showing a variant of the invention.
Figure 7:
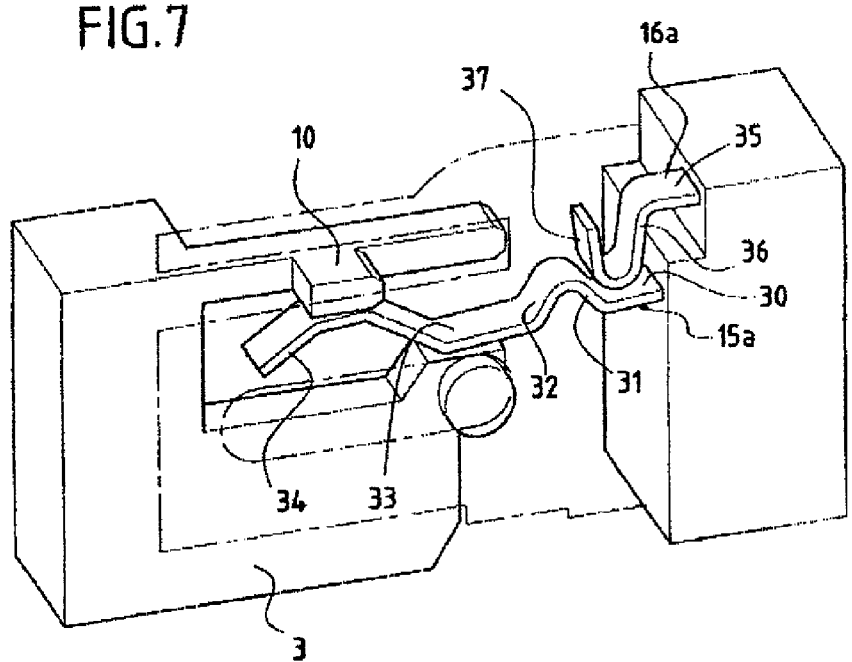

In FIGS. 6 and 7 an embodiment is shown in which the electric circuit 15a comprises a tongue 30 with a V-shaped section with two branches 31 and 32, branch 32 being extended by a rectilinear section 33 with an arched section 34 at the end, whilst the circuit 16a is provided with a tongue 35 with a V-shaped end section with two branches 36 and 37.

The branches 31 and 37 form the electrical contact zones which as in the preceding embodiment are of the sliding contact type.

When the buckle is not closed the branch 37 interacts with branch 31 so as to close the circuit of the indicating means, whereas when the pin is inserted into the slot it pushes the bar 10 which interacts with section 34 in order to separate the buckle 31 from the branch 37.

Of course, the invention is not restricted to the embodiments described and illustrated above. It would also be possible to modify many of the details without exceeding the scope of the invention.

The invention claimed is:

1. Buckle of a seat belt of a motor vehicle comprising: a female element (5) consisting of an insulating housing in which electric feed circuits are housed for means of indicating the closure or opening of the buckle, said circuits comprising electric contacts that are kept in a closed position and can be separated by a mobile insulating bar (10) in the housing against the action of elastic means (11), and a male element (1) mounted on the belt and comprising a pin (3) designed to be engaged in a slot of the female element (5) and to be clamped in the latter by unlockable elements (9), the introduction of said pin (3) in the slot (6) causing the movement of the bar (10) which controls the opening of the electric contacts, the buckle of the seat belt being characterized in that the electric contacts are carried by a first tongue and a second tongue (30, 35), the first tongue (30) having a V-shaped section with two branches (31, 32) forming a convex section, one of which constitutes an electric contact and a cambered end (34), the convex sections facing opposite the second tongue (34) which has a V-shaped section with branches (36, 37), one of which constitutes an electric contact and is designed to bear against the electric contact of the first tongue (30), the cambered end (34) being designed to interact with the bar (10) to control the opening of the electric contacts.

2. Buckle of a seat belt of a motor vehicle according to claim 1, characterized in that the second tongue (25) is extended by a cambered section (29) the convex section of which is opposite the cambered section (22) of the first tongue (18).

3. Buckle of a seat belt of a motor vehicle according to claim 2, characterized that the cambered section of one of the tongues (18) is pierced by an opening (23) in which the cambered section (29) of the other tongue (25) is inserted.

4. Buckle of a seat belt of a motor vehicle according to claim 1, characterized in that the electric contacts are sliding contacts.

* * * * *